United States Patent Office 3,522,079
Patented July 28, 1970

3,522,079
PRECIPITATION COATING PROCESS FOR COATING METAL OXIDE PARTICLES WITH A HYDROUS METAL OXIDE
Thomas James Wiseman, Darlington, England, assignor to British Titan Products Company Limited, Billingham, Durham, England, a corporation of the United Kingdom
No Drawing. Filed Aug. 17, 1967, Ser. No. 661,194
Claims priority, application Great Britain, Oct. 25, 1966, 47,832/66; Feb. 14, 1967, 7,086/67
Int. Cl. C09c 1/36, 3/00; B44d 1/02
U.S. Cl. 117—100
24 Claims

ABSTRACT OF THE DISCLOSURE

A process for coating metal oxide particles with a hydrous metal oxide comprising forming an aqueous solution of a hydrolyzable metal salt, raising the pH value of the solution until a precipitate forms, heating the solution to redissolve the precipitate, thereafter mixing the solution thus prepared with metal oxide particles and precipitating a hydrous metal oxide upon the particles from the solution.

---

The present invention relates to a process for coating metal oxide particles, particularly pigmentary titanium dioxide particles, with hydrous metal oxide(s).

Metal oxide particles such as pigmentary titanium dioxide particles, are commonly coated with one or more hydrous metal oxides, for example of aluminium, titanium, zirconium and/or cerium. Such coatings are generally applied to modify the dispersion properties of the metal oxide particles and/or to improve their photochemical reactivity, in the medium in which they are dispersed for use.

It is desirable that such hydrous metal oxide coatings should be firmly adherent to the surface of the metal oxide particle and should preferably be as dense as possible (as opposed to a loosely adherent "fluffy" coating).

It is also desirable, in appropriate cases, to be able to apply a single coating of, for example, alumina of this type to the metal oxide particles without the necessity for first coating the particle with another oxide such as silica (which may be undesirable) and this has hitherto proved very difficult to accomplish.

The quality of the hydrous metal oxide coating applied may be readily determined from an electron micrograph of the coated particles and/or by the performance of the coated pigment particles in certain tests, for example those described later in this specification.

It is, therefore, an object of the present invention to provide an improved process for coating metal oxide particles with hydrous metal oxide(s).

Accordingly, the present invention is a process for coating metal oxide particles comprising forming an aqueous solution of a hydrolyzable metal salt; raising the pH value of the solution until a precipitate forms; heating the solution to redissolve the precipitate; mixing the resulting metal-containing solution with insoluble metal oxide particles; precipitating hydrous metal oxide from the solution upon the particles and thereafter recovering the coated metal oxide particles.

The process of the present invention is hereinafter described in the coating of pigmentary titanium dioxide particles with alumina but the process is of general applicability in the coating of metal oxide particles with hydrous metal oxide(s).

Where the particles are to be coated, for example, with alumina, the aluminium salt is preferably a salt containing a monovalent anion, particularly such a salt of an inorganic acid, for example aluminium trichloride or nitrate, which are readily water-soluble, hydrolyzable salts of aluminum, although aluminum salts containing polyvalent anions such as aluminium sulphate may be used, if desired.

The initial aqueous solution conveniently contains between 0.5 and 200, and particularly between 1 and 150, grams/litre of the salt (expressed as the oxide) for solutions containing monovalent anions and preferably a concentration in the range of 2 to 50 grams/litre for solutions containing polyvalent anions (particularly for aluminium sulphate solutions). Such aqueous solutions normally have a pH value below about 3.7.

The pH value is then raised by the addition of a water soluble alkali, for example an alkali metal hydroxide or carbonate, until a white precipitate forms. Such a precipitate generally begins to form in an aqueous aluminium salt solution at a pH value in excess of about 3.4 in a solution of an aluminium salt having a monovalent anion and at a pH in excess of about 3.2 where the aluminium salt contains a polyvalent anion, and it is preferred, for example when coating with alumina, to adjust the pH value at this stage to one in the range 3.8 to 5.0, and particularly to one in the range 4.2 to 4.8 for solutions of salts having a monovalent anion, and to one in the range 3.4 to 4.5, and particularly 3.4 to 4.2 for solutions of salts having a polyvalent anion.

Alternatively, the preferred amount of alkali to be added may be expressed as that sufficient to give a ratio of the metal (e.g. aluminium) to hydroxyl groups in the solution in the range of 1:1.5 to 1:2.8 and particularly a ratio in the range 1:2 to 1:2.5 for solutions of salts having a monovalent anion and in the range 1:0.2 to 1:1.5, particularly 1:0.3 to 1:0.9, for solutions of a salt having a polyvalent anion.

When the desired amount of alkali has been added to form a precipitate, the mixture is heated to redissolve the precipitate. It is believed that the heating may also "age" the solution thereby making it more suitable for the process of the present invention.

It is preferred not to boil the solution at this stage and a convenient maximum temperature is about 90° C. Generally, heating to a temperature below 25° C. is not favoured. It is preferred to heat the solution to a temperature in the range 40° C. to 90° C. and to heat to a higher temperature in this range the more concentrated the solution. Heating is conveniently carried out for a period in the range 5 to 200 minutes and preferably for about 30 to 60 minutes.

The solution, after heating to redissolve the precipitate, is normally diluted, if necessary, to a suitable concentration for use in the coating process. The degree of dilution will depend to some extent upon the amount of hydrous metal oxide to be applied to the particles. Generally, dilution, where necessary, to give a solution containing between about 0.5 and 6 grams/litre of the salt (expressed as the oxide) is preferred.

The insoluble metal oxide particles, parfticularly pigmentary titanium dioxide particles, are then suspended in the solution.

It has been found that aqueous solutions prepared as described above are generally excellent dispersing agents for metal oxide particles and provide acceptable dispersion of the particles without the addition of another dispersing agent such as silicates, polyphosphates, metaphosphates and organic dispersing agents such as isopropanolamines (which may have an adverse effect upon the subsequent use of the metal oxide particles) although the latter may, of course, be added if desired.

After dispersion of the metal oxide particles in the solution the pH value of the dispersion is slowly raised by the addition of a water-soluble alkali, for example a water-soluble alkali metal hydroxide or carbonate.

This adjustment is conveniently carried out over a period of from 0.25 to 10 hours and preferably between 3 and 5 hours to a pH value of at least 5.7 and preferably to a value in the range 5.7 to 6.0 in order to ensure precipitation of alumina upon the oxide particles in the desired form for solutions of salts having a monovalent anion. Agitation of the suspension may be provided during the period but should preferably not be too vigorous.

In the case of solutions of salts having a polyvalent anion the initial adjustment is preferably to a value in the range 5.1 to 6.3 and particularly to one in the range 5.7 to 6.1.

After this initial adjustment has been accomplished more alkali is preferably added, for example over a period of 1 to 3 hours, to give a pH value of at least 6.5, after which the pH value is conveniently adjusted, rapidly if desired, to a substantially neutral pH value (i.e. one in the range 7 to 8.5) to ensure that the coated particles do not exhibit excess acidity or alkalinity.

During these adjustments of pH value the temperature of the suspension may be maintained at any suitable value but it is preferred to maintain it in the range 10° C. to 50° C. and particularly in the range 15° C. to 45° C.

The coated metal oxide particles may then be recovered, for example by filtration, decantation or by the use of a centrifuge, washed and dried.

If the coated particles are to be used for pigmentary purposes they will normally be subjected to milling, for example to wet sand milling or to fluid energy milling before packing.

It is preferred that the process of the present invention be applied to uncoated metal oxide particles or to particles which have already been coated by the process of the present invention (and which, in the case of titanium dioxide particles may be anatase or rutile and may have been produced by the so-called "sulphate" or "chloride" processes).

If desired, it may be possible to precipitate the hydrous metal oxide from the metal-containing solution upon the oxide particles by means of the passage of an electric current rather than by the addition of an alkali. Such a method is particularly attractive, for example, where the solution formed by raising the pH value of the metal salt solution until a precipitate forms, followed by heating the solution to redissolve the precipitate, is also used as a dispersing agent for the milling of the particles. Once the milling has been accomplished the oxide particles in the suspension may be recovered by means of electrophoretic separation. During the passage of the current the hydrous metal oxide may be deposited upon the metal oxide particles, thereby achieving the coating and recovery of the particles in a single step. It may, of course, be desirable to dilute the suspension before subjecting it to the electrophoretic recovery/coating step.

Alternatively, if desired, the hydrous metal oxide can be precipitated upon the metal oxide particles by the addition of alkali in the manner described in U.S. application 565,077, i.e. by the simultaneous addition of metal-containing solution (prepared as described in the preceding paragraph) and alkali. It has been found that by this method of carrying out the present invention the quality of the hydrous metal oxide coating on the metal oxide particles may be even further improved.

The following examples show embodiments of the present invention.

EXAMPLE 1

An aqueous aluminium trichloride solution (M/1) was prepared and 300 ml. of this was mixed with 340 ml. of an aqueous 2 N solution of sodium hydroxide. The mixture had a pH value of 3.8. A white precipitate formed and the mixture was heated to 90° C. for about 1 hour to redissolve the precipitate. The final solution was diluted to a molarity of 0.26 aluminium (expressed as $Al_2O_3$).

A quantity (400 ml.) of this solution was diluted with 4.5 litres distilled water to form the coating solution and in this were suspended (with stirring but without another dispersing agent) 600 g. of uncoated pigmentary rutile titanium dioxide particles giving a suspension having a pH value of 4.1.

Aqueous sodium hydroxide (500 ml. N/10) was added to give a pH of 5.6.

Thereafter, over a period of four hours 230 ml. of N/10 aqueous sodium hydroxide were added to bring the pH value to 6.3. During this period the alumina was deposited upon the titanium dioxide particles.

The pH of the suspension was finally raised to 7.5 by the addition of N/10 aqueous sodium hydroxide (over a period of 1 hour) and the titanium dioxide particles were recovered by filtration, washed and dried.

The particles contained 1.82% $Al_2O_3$ and electron micrographs showed the particles to have a closely adherent dense layer of alumina uniformly deposited upon them which was quite unlike the rather diffuse, "fluffy" and non-uniform layer of alumina deposited on similar particles by conventional alumina coating techniques in the absence of silica.

EXAMPLE 2

An aqueous solution of aluminium nitrate of similar molarity to the aluminium chloride solution in Example 1 was formed mixed with sodium hydroxide and heated to redissolve the precipitate as described in Example 1.

The coating solution was prepared by mixing 435 ml. of the heated solution with 4 litres of distilled water and 500 g. uncoated rutile titanium dioxide were suspended therein.

The pH of the solution was initially raised to 5.7 by the addition of 327 ml. N/10 aqueous sodium hydroxide and from 5.7 to 6.3 over a period of 4 hours by the addition of 493 ml. of N/10 sodium hydroxide solution. The pH value was finally adjusted to 8 with N/10 sodium hydroxide solution (over a period of 1 hour) and the alumina coated $TiO_2$ pigment filtered off, washed and dried.

The dried pigment contained 2.1% $Al_2O_3$ and the appearance of the particles in electron micrographs was indistinguishable from the product of Example 1.

The pigments produced as described in Examples 1 and 2 were tested for (a) Reactivity in paint (after one day's storage)
(b) Drying time in paint media (after twelve days' storage), and
(c) by the Jacobsen Test and the results were compared with those obtained from:

(1) an uncoated rutile pigment, and
(2) a rutile pigment coated with silica, titania and alumina by conventional means (i.e. by suspending the pigment in aqueous sodium silicate solution followed by the addition of aqueous aluminium and titanium sulphate solutions and neutralisation)

as shown in the following table:

| Pigment | Reactivity | Drying Time | Jacobsen Test, percent |
|---|---|---|---|
| Example 1 | 34 | 5½ | 83 |
| Example 2 | 34 | 6 | 82 |
| Uncoated | 22 | 7¾ | 66 |
| Coated with $SiO_2$, $TiO_2$ and $Al_2O_3$ | 137 | 17 | 73 |

EXAMPLE 3

An aqueous aluminium trichloride solution (M/1) was prepared and 1,000 ml. was mixed with 1.130 ml. of aqueous 2 N sodium hydroxide to give a mixture having a pH of 3.8. A white precipitate formed which redissolved after heating to 90° C. for 1 hour. The solution was diluted to a molarity of 0.26 (expressed as $Al_2O_3$) and 1,200 ml. were added to 680 g. $TiO_2$ particles.

The resulting slurry was milled without any other dispersing agent by agitation with 2 litres of Ottawa sand in a sand mill consisting of a container of 6″ internal diameter in which rotated (at 3,360 r.p.m.) an impeller shaft bearing 3 circular impellers 3″ diameter.

During milling the pH value rose from 3.6 to 4.2.

The sand was separated from the slurry of ground $TiO_2$ particles and the latter was diluted to a volume of 5 litres. The pH value of the slurry was raised to 5.7, then from 5.7 to 6.2 over a period of 6 hours with N/10 sodium hydroxide and finally from 6.2 to 8 over a period of 30 minutes.

The $TiO_2$ was then filtered off, washed and dried.

The pigment, when tested by the Jacobsen test, gave a value of 72.4%. A similar pigment without the alumina coating gave a value of 64%.

EXAMPLE 4

An aqueous aluminium sulphate solution (0.2 M) was prepared and 100 ml. diluted to 1 litre with distilled water. Aqueous normal sodium hydroxide (29.4 ml.) was added and a white precipitate formed which redissolved after heating for 2 hours at 90° C. The aluminium content (expressed as $Al_2O_3$) was 4.48 g./litre; the pH value 3.4 and the Al:OH ratio 1:0.75.

A portion of this solution (224 ml.) was added to a slurry of 50 g. $TiO_2$ in 500 ml. distilled water and aqueous sodium hydroxide (N/10) was added to the resulting mixture over a period of 6 hours to give a pH of 7.75. This pH value was maintained for 30 minutes before the $TiO_2$ was filtered off and washed to remove sulphate ions.

The pigment particles contained 2.18% $Al_2O_3$ (on $TiO_2$) and when tested by the Jacobsen test gave a value of 71.6%. A similar uncoated pigment gave a value of 64%.

EXAMPLE 5

The process of Example 4 was repeated except that a solution containing only 2.2 g./litre of aluminium (expressed as $Al_2O_3$) having a pH value of 3.2 and an Al:OH ratio of 1:0.375 was prepared.

A volume (395 ml.) of this solution was added to a slurry of 50 g. rutile $TiO_2$ in 500 ml. distilled water and aqueous N/10 sodium hydroxide added over a period of 6 hours to give a final pH value of 7.7.

The $TiO_2$, when filtered off, washed and dried, had an $Al_2O_3$ content of 2.80% (on $TiO_2$) and gave a result by the Jacobsen test of 70.7% (compared with a value of 64% for a similar uncoated $TiO_2$ pigment).

EXAMPLE 6

An aqueous suspension of pigmentary rutile $TiO_2$ particles was prepared by stirring. The suspension contained 125 g./litre $TiO_2$.

The pH value of the suspension was adjusted to a value of 5.7 by the addition of normal nitric acid.

An aqueous solution of aluminium nitrate (M/1) was prepared and 300 ml. were mixed with 340 ml. of aqueous sodium hydroxide (2 N). A white precipitate formed which redissolved on heating.

A quantity (400 ml.) of the solution was diluted with 4 litres of distilled water to form the coating solution.

The coating solution and N/10 aqueous sodium hydroxide were then simultaneously run into the stirred suspension of $TiO_2$ particles maintained at 50° C. over a period of 3 hours and in such relative quantities as to maintain a pH value of 5.7 throughout the addition.

The suspension was stirred for 15 minutes after the additions were complete and aqueous sodium hydroxide was then added to give a pH value of 7.5 after which the alumina-coated pigment was filtered off, washed, dried and fluid energy milled before testing for drying time (after 14 days), reactivity (after 1 day's storage) and by the Jacobsen test. The results are given in the table below.

EXAMPLE 7

The process described in Example 6 was repeated but the pH value of the aqueous $TiO_2$ suspension was initially adjusted to 5.9 and this value was maintained during the simultaneous addition of the aluminium-containing coating solution and aqueous sodium hydroxide. After recovery, washing, drying and milling the alumina-coated pigment was tested as described in Example 6. The results are given in the table below.

EXAMPLE 8

The processes described in Examples 6 and 7 were repeated but the aluminium-containing coating solution was prepared from an aqueous aluminium chloride solution and the pH value of the $TiO_2$ suspension before, and during, the simultaneous addition of the coating solution and aqueous sodium hydroxide was maintained at 5.1.

The coated pigment was also treatment and tested as described in Example 6 and the results are given in the table below.

The results obtained from similar tests on a similar $TiO_2$ pigment coated with 0.5 $SiO_2$ and 2% alumina and 1.5% $TiO_2$ (the latter coatings from a mixed aluminium and titanium sulphate solution by conventional rapid neutralisation) are also given as a control for comparison.

| Pigment | Reactivity | Drying Time | Jacobsen Test, percent |
|---|---|---|---|
| Example 6 | 36 | 6¾ | 80.7 |
| Example 7 | 37 | 6¾ | 84.4 |
| Example 8 | 36 | 6 | 72.8 |
| Control | 78 | 22 | 73.1 |

The *Reactivity* of the pigments is tested by milling the pigment for 16 hours with a copal varnish/white spirit medium of known viscosity at a pigment/medium ratio of 1:1. After milling the effluxion time of the product from a No. 4 Ford cup is measured and the product is stored for 24 hours at 21° C. and the effluxion time is again measured. The difference in efflux time (in seconds) between the latter two measurements is the figure given in the tables—the higher the figure the greater the reactivity.

The *Drying time* is the time required for the drying of 0.003″ thick wet paint films containing the pigment as measured on a Beck-koller drying time recorder at 21° C. and a relative humidity of 65%.

The *Jacobsen test* (which is a test for resistance to discolouration under UV light) is carried out by mixing a predetermined amount of the pigment with glycerol and sealing an opaque film of the mixture between glass slides.

The reflectance of the film is measured through the green filter of a Harrison Colourimeter and the film is exposed to a source of ultraviolet light for a predetermined period. The reflectance is again measured as described above.

The result is expressed as the percent of green reflectance retained after exposure to ultraviolet light—a lower figure indicates a greater discolouration.

What is claimed is:

1. A process for coating metal oxide particles comprising forming an aqueous solution of a hydrolyzable metal salt selected from the group consisting of salts of aluminum, titanium, zirconium, cerium, and mixtures thereof; raising the pH value of the solution until a precipitate forms; heating the solution to a temperature sufficient to dissolve the precipitate; mixing the resulting solution with insoluble metal oxide particles; precipitating hydrous metal oxide from the solution upon the particles and thereafter recovering the coated metal oxide particles.

2. A process as claimed in claim 1 wherein the hydrolyzable metal salt is an aluminium salt.

3. A process as claimed in claim 1 wherein the metal salt has a monovalent anion.

4. A process as claimed in claim 1 wherein the metal salt has a polyvalent anion.

5. A process as claimed in claim 1 wherein the solution contains from 0.5 to 200 grams/litre (expressed as the metal oxide) of the hydrolyzable metal salt.

6. A process as claimed in claim 3 wherein the solution contains a hydrolyzable metal salt in a concentration in the range 1 to 150 grams/litre (expressed as the oxide).

7. A process as claimed in claim 4 wherein the solution contains a hydrolyzable metal salt in a concentration in the range 2 to 50 grams/litre (expressed as the oxide).

8. A process as claimed in claim 3 wherein the pH value is adjusted to one in the range 4.2 to 4.8 to form a precipitate.

9. A process as claimed in claim 4 wherein the pH value is adjusted to one in the range 3.4 to 4.2 to form the precipitate.

10. A process as claimed in claim 3 wherein sufficient alkali is added in the formation of the precipitate to give a ratio of metal to hydroxyl groups in the mixture in the range 1:1.5 to 1:2.8.

11. A process as claimed in claim 4 wherein sufficient alkali is added in the formation of the precipitate to give a ratio of metal to hydroxyl groups in the mixture in the range 1:0.2 to 1:1.5.

12. A process as claimed in claim 1 wherein the mixture is heated to a temperature in the range 25° to 90° C. to redissolve the precipitate.

13. A process as claimed in claim 1 wherein the mixture, after heating to a temperature sufficient to dissolve the precipitate, is diluted to give a solution containing between 0.5 to 6 grams/litre of the salt (expressed as the oxide).

14. A process as claimed in claim 1 wherein the hydrous metal oxide is precipitated upon the metal oxide particles by the addition of sufficient alkali to raise the pH value to at least 5.7.

15. A process as claimed in claim 14 wherein the pH is raised over a period of 3 to 5 hours.

16. A process as claimed in claim 14 wherein more alkali is subsequently added to raise the pH value to at least 6.5.

17. A process as claimed in claim 16 wherein the pH value is raised over a period of 1 to 3 hours.

18. A process as claimed in claim 1 wherein the pH value of the mixture, before recovery of the coated metal oxide particles, is adjusted to one in the range 7 to 8.5.

19. A process as claimed in claim 1 wherein the initial insoluble metal oxide particles are uncoated particles or particles which have already been coated by the process of the present invention.

20. A process as claimed in claim 1 wherein the step of precipitating hydrous metal oxide from the solution upon the particles is effected by passage of an electric current through the mixture obtained by mixing said resulting solution with said insoluble metal oxide particles and the coated particles are recovered by means of electrophoretic separation.

21. A process for coating metal oxide particles comprising
 (A) forming an aqueous solution of a hydrolyzable metal salt selected from the group consisting of salts of aluminum, titanium, zirconium, cerium, and mixtures thereof;
 (B) raising the pH value of the solution until a precipitate forms;
 (C) heating the solution to a temperature sufficient to dissolve the precipitate;
 (D) simultaneously adding the resulting solution and alkali to a suspension of insoluble metal oxide particles, whereby a hydrous metal oxide precipitates upon said particles, and thereafter
 (E) recovering coating metal oxide particles.

22. A process for coating titanium dioxide particles comprising forming an aqueous solution containing from 0.5 to 200 grams/litre (expressed as the corresponding oxide) of a hydrolyzable aluminum salt; raising the pH value of the solution until a precipitate forms; heating the solution to a temperature in the range of 25° C. to 90° C. to dissolve the precipitate; mixing the resulting solution with insoluble titanium dioxide particles; precipitating hydrous aluminum oxide from the latter solution upon the particles and thereafter recovering the coated titanium dioxide particles.

23. A process as claimed in claim 22, wherein the hydrolyzable aluminum salt has a monovalent anion and is contained in said solution in a concentration in the range of 1 to 150 grams/litre (expressed as the oxide) and wherein the initial precipitate is formed by adding sufficient alkali to raise the pH of the solution to a value in the range of 4.2 to 4.8 and to provide a ratio of aluminum to hydroxyl groups in the solution in the range of 1:1.5 to 1:2.8.

24. A process as claimed in claim 22, wherein the hydrolyzable aluminum salt has a polyvalent anion and is contained in said solution in a concentration in the range of 2 to 50 grams/litre (expressed as the oxide) and wherein the initial precipitate is formed by adding sufficient alkali to raise the pH of the solution to a value in the range of 3.4 to 4.2 to provide a ratio of an aluminum to hydroxyl groups in the solution in the range of 1:0.2 to 1:1.5.

References Cited
UNITED STATES PATENTS

| | | | |
|---|---|---|---|
| 2,187,050 | 1/1940 | Patterson | 106—300 |
| 2,284,772 | 6/1942 | Seidel | 106—300 |
| 2,671,031 | 3/1954 | Whately | 106—300 |
| 2,900,320 | 8/1959 | Metcalfe et al. | 204—180 X |
| 3,146,119 | 8/1964 | Ritter | 106—308 X |
| 3,251,705 | 5/1966 | Rieck et al. | 106—300 |
| 3,409,454 | 11/1968 | Andrew et al. | 106—300 |

FOREIGN PATENTS

| | | |
|---|---|---|
| 1,022,621 | 3/1966 | Great Britain. |
| 248,100 | 12/1960 | Australia. |

WILLIAM D. MARTIN, Primary Examiner

R. P. PERRONE, Jr., Assistant Examiner

U.S. Cl. X.R.

117—169; 106—300, 308; 204—180